United States Patent
Shibata et al.

(10) Patent No.: US 9,085,462 B2
(45) Date of Patent: Jul. 21, 2015

(54) SILICON NITRIDE POWDER PRODUCTION METHOD, SILICON NITRIDE POWDER, SILICON NITRIDE SINTERED BODY AND CIRCUIT SUBSTRATE USING SAME

(71) Applicant: Ube Industries, Ltd., Ube-shi (JP)

(72) Inventors: Koji Shibata, Ube (JP); Takuji Ohmaru, Ube (JP); Takeshi Yamao, Ube (JP); Masataka Fujinaga, Ube (JP); Michio Honda, Ube (JP); Takayuki Fujii, Ube (JP)

(73) Assignee: Ube Industries, Inc. (JP)

( * ) Notice: Subject to any disclaimer, the term of this patent is extended or adjusted under 35 U.S.C. 154(b) by 0 days.

(21) Appl. No.: 14/387,281

(22) PCT Filed: Mar. 25, 2013

(86) PCT No.: PCT/JP2013/058645
§ 371 (c)(1),
(2) Date: Sep. 23, 2014

(87) PCT Pub. No.: WO2013/146713
PCT Pub. Date: Oct. 3, 2013

(65) Prior Publication Data
US 2015/0056121 A1    Feb. 26, 2015

(30) Foreign Application Priority Data

Mar. 28, 2012 (JP) .................. 2012-074863
Nov. 16, 2012 (JP) .................. 2012-251815

(51) Int. Cl.
*C01B 33/06* (2006.01)
*C01B 21/068* (2006.01)
*C04B 35/593* (2006.01)

(52) U.S. Cl.
CPC ............ *C01B 21/0687* (2013.01); *C01B 21/068* (2013.01); *C04B 35/5935* (2013.01); *C01P 2006/12* (2013.01); *C01P 2006/80* (2013.01); *C04B 2235/3206* (2013.01); *C04B 2235/3225* (2013.01); *C04B 2235/5409* (2013.01); *C04B 2235/723* (2013.01); *C04B 2235/77* (2013.01); *C04B 2235/96* (2013.01)

(58) Field of Classification Search
CPC ...... C01B 33/06; C01B 21/068; C01B 33/08; C01B 21/00
USPC .......................................... 423/344
See application file for complete search history.

(56) References Cited

FOREIGN PATENT DOCUMENTS

| JP | 04-114908 A | 4/1992 |
| JP | 04-209706 A | 7/1992 |
| JP | 05-148032 A | 6/1993 |
| JP | 05-221617 A | 8/1993 |
| JP | 06-329404 A | 11/1994 |
| JP | 08-012306 A | 1/1996 |
| JP | 09-156912 A | 6/1997 |

*Primary Examiner* — Edward Johnson
(74) *Attorney, Agent, or Firm* — DLA Piper LLP (US)

(57) ABSTRACT

A method of producing a silicon nitride powder includes heating an amorphous Si—N(—H)-based compound in which assuming that the specific surface area is RS (m²/g) and the oxygen content ratio is RO (mass %), RS/RO is 500 or more, at a temperature rising rate of 12 to 100° C./min in a temperature range from 1,000 to 1,400° C. while flowing the compound by a continuous firing furnace.

20 Claims, No Drawings

SILICON NITRIDE POWDER PRODUCTION METHOD, SILICON NITRIDE POWDER, SILICON NITRIDE SINTERED BODY AND CIRCUIT SUBSTRATE USING SAME

TECHNICAL FIELD

The present invention relates to a production method of a silicon nitride powder capable of providing a dense silicon nitride sintered body having excellent mechanical strength, and in particular, a silicon nitride sintered body having both high thermal conductivity and excellent mechanical strength, and a silicon nitride powder obtained by the production method.

The present invention also relates to a silicon nitride sintered body having both high thermal conductivity and excellent mechanical strength, and a circuit substrate using the same.

BACKGROUND ART

A silicon nitride sintered body obtained by molding and heating/sintering a silicon nitride powder is excellent in high strength, corrosion resistance, thermal impact resistance, thermal conductivity, electrical insulation and the like, and therefore being used, for example, as a wear-resistant member such as cutting tip and ball bearing, a high-temperature structural member such as automotive engine component, and a circuit substrate. The silicon nitride sintered body is usually produced by mixing a sintering aid with a silicon nitride powder, subjecting the mixture to press molding, injection molding, extrusion molding or the like to form a compact, and sintering the compact.

The method for obtaining a silicon nitride sintered body having a high mechanical strength includes, for example, the method of Patent Document 1. Patent Document 1 discloses a production method including pyrolyzing an amorphous silicon nitride powder and/or a nitrogen-containing silane compound, wherein a silicon nitride powder with the internal oxygen amount and surface oxygen amount being adjusted to specific ranges is obtained by controlling the oxygen amount in the amorphous silicon nitride powder and/or nitrogen-containing silane compound and the oxygen partial pressure in the firing (pyrolysis) atmosphere. It is stated that the bending strength of a silicon nitride sintered body produced using the silicon nitride powder above shows a high value both at room temperature and at 1,200° C. In the production method of Patent Document 1, the surface oxygen amount of the silicon nitride powder can be adjusted to a range suitable for sintering, but the method does not achieve success in adjusting the surface oxygen amount to a range suitable for sintering and at the same time, reducing the internal oxygen amount.

On the other hand, Patent Document 2 discloses a direct nitridation method including heating a metallic silicon powder in a nitrogen gas atmosphere or a nitrogen-containing non-oxidizing gas atmosphere, wherein a silicon nitride powder more reduced in the internal oxygen amount than in the silicon nitride powder of Patent Document 1 is obtained by controlling the oxygen content of the raw material metallic silicon powder and the amount of water in the atmosphere above. However, this silicon nitride powder is produced by a direct nitridation method, and therefore not only a pulverization step is required but also a silicon nitride sintered body obtained by sintering the silicon nitride powder above fails to have a high mechanical strength. In using a silicon nitride powder produced by a direct nitridation method for the raw material of a sintered body, the powder must be pulverized as described above, which makes it difficult to obtain a powder having both appropriate particle size distribution and specific surface area to enable increasing the sintering density, and moreover, a part of an acid used for removing an impurity mixed during pulverization unavoidably remains in the silicon nitride powder. Furthermore, in a direct nitridation method, the raw material metallic silicon (metal silicon) is likely to remain inside a silicon nitride particle constituting the silicon nitride powder and often gives rise to production of a pore or a coarse particle in the inside of a silicon nitride sintered body, and this is also the reason.

The silicon nitride sintered body is used not only as a structural member but also as a circuit substrate, and a silicon nitride sintered body having, among others, a high coefficient of thermal conductivity, in addition to high mechanical strength, is required. Patent Documents 1 and 2 are silent on the coefficient of thermal conductivity of the silicon nitride sintered body or use of the silicon nitride sintered body for a circuit substrate, but a silicon nitride powder suitable for the production of a silicon nitride sintered body having in particular a high coefficient of thermal conductivity as well as high mechanical strength is demanded.

RELATED ART

Patent Document

Patent Document 1: Kokai (Japanese Unexamined Patent Publication) No. 6-329404
Patent Document 2: Kokai No. 4-114908
Patent Document 3: Kokai No. 9-156912
Patent Document 4: Kokai No. 4-209706
Patent Document 5: Kokai No. 5-148032

SUMMARY OF THE INVENTION

Problems to be Solved by the Invention

As described above, in the conventional production method of a silicon nitride powder, including firing an amorphous silicon nitride powder and/or a nitrogen-containing silane compound, the amount of internal oxygen cannot be further reduced while having an appropriate amount of surface oxygen for obtaining good sinterability, and in addition, a dense silicon nitride sintered body excellent in mechanical strength, particularly, a silicon nitride sintered body having both high thermal conductivity and excellent mechanical strength, cannot be obtained. An object of the present invention is to provide a dense silicon nitride sintered body excellent in mechanical strength, and in particular, a silicon nitride sintered body having both high thermal conductivity and excellent mechanical strength, a silicon nitride powder that is a raw material of the sintered body, and a production method thereof.

Means to Solve the Problems

As a result of many intensive studies on an easily sinterable silicon nitride powder capable of providing a dense silicon nitride sintered body excellent in mechanical strength or a silicon nitride sintered body having both high thermal conductivity and excellent mechanical strength, the present inventors have found that when an amorphous Si—N(—H)-based compound having a certain specific surface area is fired at a temperature of 1,400 to 1,700° C. in a nitrogen-containing inert gas atmosphere or a nitrogen-containing reducing gas atmosphere while flowing the compound by a continuous firing furnace, a silicon nitride powder being reduced in the internal oxygen and having a surface oxygen amount suitable for sintering can be obtained. It has been found that when this powder is used, a dense silicon nitride sintered body excellent in mechanical strength, particularly, a silicon nitride sintered body having both high thermal conductivity and excellent mechanical strength, can be obtained. The present invention has been accomplished based on these findings.

That is, the present invention relates to a method for producing a silicon nitride powder, including firing an amorphous Si—N(—H)-based compound having a specific surface area of 400 to 1,200 m$^2$/g at a temperature of 1,400 to 1,700° C. in a nitrogen-containing inert gas atmosphere or a nitrogen-containing reducing gas atmosphere while flowing the compound in a continuous firing furnace, wherein assuming that the specific surface area of the amorphous Si—N(—H)-based compound is RS (m$^2$/g) and the oxygen content ratio is RO (mass %), RS/RO is 500 or more and during the firing, the amorphous Si—N(—H)-based compound is heated at a temperature rising rate of 12 to 100° C./min in a temperature range from 1,000 to 1,400° C.

The present invention also relates to the above-described method for producing a silicon nitride powder, wherein the specific surface area of the silicon nitride powder is from 5 to 30 m$^2$/g and assuming that the content ratio of oxygen existing in a region from the particle surface to 3 nm beneath the particle surface is FSO (mass %), the content ratio of oxygen existing in the more inward side than 3 nm beneath the particle surface is FIO (mass %), and the specific surface area is FS (m$^2$/g), FS/FSO is from 8 to 25 and FS/FIO is 22 or more.

Furthermore, the present invention relates to the above-described method for producing a silicon nitride powder, wherein when the silicon nitride powder is measured for the particle size distribution on the volume basis by a laser diffraction particle size distribution meter, the ratio D10/D90 between a 10 vol % diameter D10 and a 90 vol % diameter D90 is 0.1 or more.

The present invention also relates to a silicon nitride powder, wherein the specific surface area is from 5 to 30 m$^2$/g; assuming that the content ratio of oxygen existing in a region from the particle surface to 3 nm beneath the particle surface is FSO (mass %), the content ratio of oxygen existing in the more inward side than 3 nm beneath the particle surface is FIO (mass %), and the specific surface area is FS (m$^2$/g), FS/FSO is from 8 to 25 and FS/FIO is 22 or more; and when the particle size distribution on the volume basis is measured by a laser diffraction particle size distribution meter, the ratio D10/D90 between a 10 vol % diameter D10 and a 90 vol % diameter D90 is 0.1 or more.

The present invention also relates to a silicon nitride sintered body obtained by sintering the above-described silicon nitride powder.

The present invention also relates to a circuit substrate using the above-described silicon nitride sintered body.

Effects of the Invention

According to the production method of the present invention, an amorphous Si—N(—H)-based compound having a specific surface area of 400 to 1,200 m$^2$/g, in which assuming that the specific surface area is RS (m$^2$/g) and the oxygen content ratio is RO (mass %), RS/RO is 500 or more, is heated at a temperature rising rate of 12 to 100° C./min in a temperature range from 1,000 to 1,400° C. and fired at a temperature of 1,400 to 1,700° C. in a nitrogen-containing inert gas atmosphere or a nitrogen-containing reducing gas atmosphere while flowing the compound in a continuous firing furnace, whereby an easily sinterable inexpensive silicon nitride powder capable of giving a dense silicon nitride sintered body excellent in mechanical strength, particularly, a silicon nitride sintered body having both high thermal conductivity and excellent mechanical strength, can be provided.

In addition, according to the present invention, a dense silicon nitride sintered body excellent in mechanical strength, particularly, a silicon nitride sintered body having both high thermal conductivity and excellent mechanical strength, is provided.

Furthermore, according to the present invention, a circuit substrate having both high thermal conductivity and excellent mechanical strength is provided.

MODE FOR CARRYING OUT THE INVENTION

The embodiments of the production method of a silicon nitride powder according to the present invention, a silicon nitride powder obtained by the production method, a silicon nitride sintered body, and a circuit substrate using the same are described in detail below.

In the present invention, as for oxygen in a silicon nitride powder, the oxygen existing in a region from the particle surface to 3 nm beneath the particle surface is defined as surface oxygen, the oxygen existing in the more inward side than 3 nm beneath the particle surface is defined as internal oxygen, the content ratio of the surface oxygen is denoted by FSO (mass %), and the content ratio of the internal oxygen is denoted by FIO (mass %).

The silicon nitride powder obtained by the production method of the present invention is an easily sinterable silicon nitride powder produced by thermally decomposing an amorphous Si—N(—H)-based compound wherein the content ratio of surface oxygen based on the specific surface area, i.e., FS/FSO, is from 8 to 25, and the content ratio of internal oxygen based on the specific surface area, i.e., FS/FIO is 22 or more. In the silicon nitride powder obtained in the present invention, the content ratio FSO of surface oxygen is preferably from 0.5 to 1.3 mass %, and the content ratio FIO of internal oxygen is preferably 1.0 mass % or less.

The production method of a silicon nitride powder of the present invention is described below.

The silicon nitride powder of the present invention can be produced by subjecting an amorphous Si—N(—H)-based compound having a specific surface area of 400 to 1,200 m$^2$/g, in which assuming that the specific surface area is RS (m$^2$/g) and the oxygen content ratio is RO (mass %), RS/RO is 500 or more, preferably 550 or more, more preferably 1,000 or more, to heating at a temperature rising rate of 12 to 100° C./min in a temperature range from 1,000 to 1,400° C. and firing at a temperature of 1,400 to 1,700° C. in a nitrogen-containing inert gas atmosphere or a nitrogen-containing reducing gas atmosphere while flowing the compound by a continuous firing furnace.

In the present invention, an amorphous Si—N(—H)-based compound is fired to produce a crystalline silicon nitride powder. The amorphous Si—N(—H)-based compound used in the present invention is an amorphous Si—N—H-based compound containing Si, N and H elements or an amorphous silicon nitride containing Si and N, each obtained by thermally decomposing a part or the whole of a nitrogen-containing silane compound such as silicon diimide, silicon tetraamide and silicon chloroimide, and is represented by the following composition formula (1). Incidentally, in the present invention, the amorphous Si—N(—H)-based compound encompasses all of a series of compounds represented by composition formula (1) from $Si_6N_1(NH)_{10.5}$ when x=0.5 to amorphous $Si_3N_4$ when x=4, and $Si_6N_6(NH)_3$ when x=3 is called silicon nitrogen imide.

$$Si_6N_{2x}(NH)_{12-3x} \quad (1)$$

(provided that x=0.5 to 4 in the formula and although not shown in the composition formula, the compound includes a compound containing a halogen as an impurity).

The amount of a halogen contained as an impurity is 0.01 mass % or less but is preferably 0.005 mass % or less.

As the nitrogen-containing silane compound for use in the present invention, silicon diimide, silicon tetraamide, silicon chloroimide and the like are used. These compounds are represented by the following composition formula (2). In the present invention, for the sake of convenience, the nitrogen-containing silane compounds represented by the following composition formula (2) where y=8 to 12 are referred to as silicon diimide.

$$Si_6(NH)_y(NH_2)_{24-2y} \quad (2)$$

(provided that y=0 to 12 in the formula and although not shown in the composition formula, the compound includes a compound containing a halogen as an impurity).

The amount of a halogen contained as an impurity is 0.01 mass % or less but is preferably 0.005 mass % or less.

These are produced by a known method, for example, a method of reacting a silicon halide with ammonia, specifically, a method of reacting a silicon halide such as silicon tetrachloride, silicon tetrabromide or silicon tetraiodide with ammonia in a gas phase, or a method of reacting the silicon halide above in a liquid form with liquid ammonia.

As the amorphous Si—N(—H)-based compound for use in the present invention, those produced by a known method, for example, a method of thermally decomposing the nitrogen-containing silane compound above at a temperature of 1,200° C. or less in a nitrogen or ammonia gas atmosphere, or a method of reacting a silicon halide such as silicon tetrachloride, silicon tetrabromide or silicon tetraiodide with ammonia at a high temperature, are used.

The specific surface area of the amorphous Si—N(—H)-based compound as the raw material of the silicon nitride powder of the present invention is from 400 to 1,200 m²/g. If the specific surface area is less than 400 m²/g, abrupt crystallization occurs in a temperature range from 1,000 to 1,400° C. to allow for production of a needle-like particle or an aggregated particle. When a sintered body is produced using such a powder, a homogeneous structure is not formed, and the obtained sintered body is reduced in the strength and thermal conductivity coefficient. On the other hand, if the specific surface area exceeds 1,200 m²/g, the α fraction of the crystalline silicon nitride powder becomes small and in turn, the sinterability deteriorates, leading to reduction in the strength and thermal conductivity coefficient of the sintered body. The specific surface area of the amorphous Si—N(—H)-based compound is preferably from 450 to 800 m²/g.

Since the true density is from 1.4 to 1.9 g/cm³, the particle diameter of the amorphous Si—N(—H)-based compound can be calculated according to formula (3):

$$\text{BET equivalent diameter (nm)}=6/\text{specific surface area} \\ (\text{m}^2/\text{g})/\text{true density (g/cm}^3)\times 1000 \quad (3)$$

The particle diameter of the amorphous Si—N(—H)-based compound according to formula (3) is from 2 to 10 nm and is by far smaller than the short axis length 1 mm of the granular material described in Patent Document 5.

The amorphous Si—N(—H)-based compound of the present invention is an amorphous Si—N(—H)-based compound where assuming that the specific surface area of the amorphous Si—N(—H)-based compound is RS (m²/g) and the oxygen content ratio is RO (mass %), RS/RO is 500 or more, preferably 550 or more, more preferably 1,000 or more. Because, if RS/RO is less than 500, FS/FIO of the obtained silicon nitride powder becomes small and a silicon nitride sintered body increased in the high-temperature strength and thermal conductivity coefficient is not obtained. The upper bound of RS/RO is not limited, but a value up to at least 6,000, or up to 10,000, is allowable.

The oxygen content ratio of the amorphous Si—N(—H)-based compound can be adjusted by controlling the oxygen amount in the nitrogen-containing silane compound and the oxygen partial pressure (oxygen concentration) in an atmosphere at the time of thermal decomposition of the nitrogen-containing silane compound. As the oxygen amount in the nitrogen containing silane compound is smaller or as the oxygen partial pressure in an atmosphere at the time of thermal decomposition is lower, the oxygen content ratio of the amorphous Si—N(—H)-based compound can be reduced. The oxygen content ratio of the nitrogen-containing silane compound can be adjusted by the concentration of oxygen in the atmosphere gas during reaction in the case of reacting a silicon halide such as silicon tetrachloride, silicon tetrabromide or silicon tetraiodide with ammonia in a gas phase, and can be adjusted by controlling the water amount in an organic reaction solvent such as toluene in the case of reacting the silicon halide above with liquid ammonia. As the water amount in an organic reaction solvent is smaller, the oxygen content ratio of the nitrogen-containing silane compound can be reduced.

On the other hand, the specific surface area of the amorphous Si—N(—H)-based compound can be adjusted by the specific surface area of the nitrogen-containing silane compound as the raw material and the maximum temperature at the time of thermal decomposition of the nitrogen-containing silane compound. As the specific surface area of the nitrogen-containing silane compound is larger or as the maximum temperature at the time of thermal decomposition is lower, the specific surface area of the amorphous Si—N(—H)-based compound can be increased. The specific surface area of the nitrogen-containing silane compound can be adjusted, when the nitrogen-containing silane compound is silicon diimide, by a known method described, for example, in Patent Document 3, i.e., a method of changing the ratio between the silicon halide and the liquid ammonia (silicon halide/liquid ammonia (volume ratio)) at the time of reaction of a silicon halide with liquid ammonia. The specific surface area of the nitrogen-containing silane compound can be increased by increasing the above-described silicon halide/liquid ammonia ratio.

In the present invention, at the time of firing of the amorphous Si—N(—H)-based compound in a nitrogen-containing inert gas atmosphere or a nitrogen-containing reducing gas atmosphere, the amorphous Si—N(—H)-based compound is fired at a temperature of 1,400 to 1,700° C. by using a continuous firing furnace. As the heating furnace used for heating of the amorphous Si—N(—H)-based compound, a continuous firing furnace such as rotary kiln furnace, shaft kiln furnace and fluidized firing furnace is used. Such a continuous firing furnace is an effective measure for the efficient diffusion of heat generated in association with a crystallization reaction of the amorphous silicon nitride. Among these continuous firing furnaces, a rotary kiln furnace is suitable for forming a homogeneous powder, because the powder is transferred while applying stirring by the rotation of the furnace tube and in turn, the heat of crystallization can be efficiently dissipated, and therefore, this is a preferable firing furnace in particular.

The amorphous Si—N(—H)-based compound may be molded in a granular shape. When molded in a granular shape, the flowability of the powder is increased and at the same time, the bulk density can be increased, so that the processing capacity in a continuous firing furnace can be raised. Also, the heat conduction of the powder layer can be improved.

The nitrogen-containing inert gas atmosphere indicates, for example, a nitrogen atmosphere or an inert gas atmosphere composed of nitrogen and a rare gas such as argon and preferably contains absolutely no oxygen, and even in the case of containing oxygen, the oxygen concentration is preferably 100 ppm or less, furthermore 50 ppm or less. The nitrogen-containing reducing gas atmosphere is an atmosphere composed of an inert gas such as nitrogen and a reducing gas such as hydrogen and ammonia.

During the firing in a continuous firing furnace, the maximum temperature inside the furnace tube, that is, the firing temperature, is from 1400 to 1,700° C. If the firing temperature is less than 1,400° C., crystallization does not proceed sufficiently, and a large amount of amorphous silicon nitride is disadvantageously contained in the silicon nitride powder. Also, if the firing temperature exceeds 1,700° C., this is not preferred, because not only a coarse crystal grows but also the produced crystalline silicon nitride powder starts decomposing. The firing temperature is not limited as long as it is in the range of 1,400 to 1,700° C., but the firing temperature is preferably from 1,400 to 1,600° C., more preferably from 1,450 to 1,550° C.

In the present invention, at the time of firing in a continuous firing furnace, the amorphous Si—N(—H)-based compound is heated at a temperature rising rate of 12 to 100° C./min, preferably from 15 to 60° C./min, more preferably from 30 to 60° C./min, in the temperature range from 1,000 to 1,400° C. The reason therefor is described below.

In the present invention, the amorphous Si—N(—H)-based compound is fired to obtain a silicon nitride powder. In the temperature range from 1,000 to 1,400° C. during firing, a crystal nucleus is generated in the amorphous silicon nitride powder, crystallization of the amorphous silicon nitride starts while releasing the heat of crystallization, and the crystallized silicon nitride undergoes grain growth.

At the time of firing in a continuous firing furnace, heating at a temperature rising rate of 12 to 100° C./min, preferably from 15 to 60° C./min, more preferably from 30 to 60° C./min, is performed in the temperature range from 1,000 to 1,400° C., whereby the surface energy due to grain growth of the amorphous silicon nitride before crystallization is decreased and not only a proper generation density of crystal nuclei is achieved but also grain growth at the initial stage of crystallization is suppressed, making it possible to obtain a crystalline silicon nitride powder having a particle shape more suitable for sintering and a sharper grain size distribution.

Incidentally, the temperature rising rate at the time of heating of the amorphous Si—N(—H)-based compound in the present invention can be set by adjusting the temperature distribution inside the furnace tube of the continuous firing furnace and the transfer rate of the powder. For example, in a rotary kiln furnace, the amorphous Si—N(—H)-based compound as the raw material powder is fed into the furnace tube from a feeder provided at the inlet of the furnace tube and transferred to the maximum temperature part at the center of the furnace tube by the rotation and gradient of the furnace tube. The temperature distribution from the furnace tube inlet to the maximum temperature part can be adjusted by the temperature setting of a heater for heating, and the transfer rate of the raw material powder can be adjusted by the rotation speed and gradient of the furnace tube.

The silicon nitride powder capable of giving a silicon nitride sintered body having a high mechanical strength and a high coefficient of thermal conductivity, which is obtained by the production method of a silicon nitride powder of the present invention, is described below.

The silicon nitride powder of the present invention is a silicon nitride powder characterized in that the specific surface area is from 5 to 30 $m^2/g$; assuming that the content ratio of oxygen existing in a region from the particle surface to 3 nm beneath the particle surface is FSO (mass %), the content ratio of oxygen existing in the more inward side than 3 nm beneath the particle surface is FIO (mass %), and the specific surface area is FS ($m^2/g$), FS/FSO is from 8 to 25 and FS/FIO is 22 or more; and when the particle size distribution on the volume basis is measured by a laser diffraction particle size distribution meter, the ratio D10/D90 between a 10 vol % diameter D10 and a 90 vol % diameter D90 is 0.1 or more. The silicon nitride powder of the present invention is a silicon nitride powder having a given specific surface area, a specific FS/FSO, a specific FS/FIO and a specific D10/D90, which can give a dense silicon nitride sintered body excellent in mechanical strength, particularly, a silicon nitride sintered body having both high thermal conductivity and excellent mechanical strength, and which is obtained by the production method of the present invention for the first time.

The specific surface area (FS) of the silicon nitride powder of the present invention is from 5 to 30 $m^2/g$, preferably from 7 to 25 $m^2/g$. If the specific surface area is less than 5 $m^2/g$, the surface energy of the particle becomes small. Such a powder can not be easily sintered, and the obtained sintered body is readily reduced in the strength and thermal conductivity coefficient. If the specific surface area exceeds 30 $m^2/g$, the surface energy of the particle may become large, but the obtained compact can not easily have a high relative density or is likely to have a non-uniform relative density. In this case, the obtained sintered body is not sufficiently densified and is reduced in the strength and also in the coefficient of thermal conductivity.

In the silicon nitride powder of the present invention, the ratio (FS/FSO) between the specific surface (FS) and the content ratio (FSO) of oxygen existing in a region from the particle surface to 3 nm beneath the particle surface is from 8 to 25. When FS/FSO is from 8 to 25, wettability or solubility of the silicon nitride powder with a sintering aid during sintering is increased, and a dense silicon nitride sintered body excellent in mechanical strength or a silicon nitride sintered body having both high thermal conductivity and excellent mechanical strength is obtained. If FS/FSO is less than 8, the amount of surface oxygen relative to the specific surface area is too large and although a dense sintered body is obtained, the high-temperature strength and the coefficient of thermal conductivity are reduced. On the other hand, if FS/FSO exceeds 25, wettability of the sintering aid to the particle surface during the sintering is deteriorated and densification does not proceed sufficiently, as a result, the strength and thermal conductivity coefficient of the sintered body are reduced. FS/FSO is preferably from 10 to 22.

In the silicon nitride powder of the present invention, the ratio (FS/FIO) between the specific surface (FS) and the content ratio (FIO) of oxygen existing in the more inward side than 3 nm beneath the particle surface is 22 or more. If FS/FIO is less than 22, the internal oxygen amount relative to the specific surface area is too large, and when a silicon nitride particle dissolves in a grain boundary phase composed of a sintering aid and the like in the sintering process of the silicon nitride, the composition of the grain boundary phase is changed to inhibit the precipitation and growth of a β-columnar crystal, as a result, a sufficient exertion of mechanical properties, and in particular, high-temperature strength, of the sintered body cannot be expected. Also, a high coefficient of thermal conductivity may not be exerted. FS/FIO is more preferably 25 or more. The upper bound is not limited, but a value up to 100, furthermore, up to about 200, is feasible and preferred.

The particle size distribution of the silicon nitride powder of the present invention is in the range specified below. When measured by a laser diffraction/scattering particle diameter distribution analyzer, the ratio (D10/D90) between a 10 vol % diameter (D10) and a 90 vol % diameter (D90) is 0.1 or more. If D10/D90 is less than 0.1, the sintered structure becomes non-uniform because of a too broad particle size distribution, and a residual pore, a microcrack, etc., are generated, leading to reduction in the strength of the sintered body. The ratio (D10/D90) is preferably 0.15 or more. The upper bound is not limited, but a value up to 0.25, furthermore, up to about 0.3, is feasible and preferred.

The silicon nitride powder of the present invention is obtained by firing an amorphous Si—N(—H)-based compound in a nitrogen-containing inert gas atmosphere or a nitrogen-containing reducing gas atmosphere while flowing the compound in a continuous firing furnace and therefore, does not contain metallic silicon. When a silicon nitride powder containing metallic silicon is sintered, the metallic silicon is melted or nitrided in the temperature rise process of sintering. The molten metallic silicon aggregates the silicon nitride powder, creating a region where the silicon nitride powder is not contacted with a sintering aid in a wide range. In this region, the dissolution rate of silicon nitride in the sintering aid is low, and sintering proceeds slowly, as a result, a pore or a microcrack is produced in the silicon nitride sintered body. In the case where metallic silicon is nitrided in the temperature rise process of sintering, also in the region above, similarly to the case where metallic silicon is melted and the silicon nitride powder is aggregated, the dissolution rate of silicon nitride in a sintering aid is low, and sintering proceeds slowly, as a result, a pore or a microcrack is produced in the silicon nitride sintered body. The silicon nitride powder of the present invention does not produce a pore and a microcrack in the silicon nitride sintered body, which are attributable to metallic silicon, and therefore, a high-strength silicon nitride sintered body is readily obtained. The silicon nitride powder of the present invention does not contain metallic silicon. It is preferred that metallic silicon is not detected in the measurement by a hydrogen gas generation-gas volume method in conformity with the free silicon quantification method of JIS R1616-9. That is, the content thereof is preferably less than 0.01 mass %.

The silicon nitride powder of the present invention is a silicon nitride powder obtained only when an amorphous Si—N(—H)-based compound having a specific surface area of 400 to 1,200 m²/g, in which assuming that the specific surface area is RS (m²/g) and the oxygen content ratio is RO (mass %), RS/RO is 500 or more, is heated at a temperature rising rate of 12 to 100° C./min in a temperature range from 1,000 to 1,400° C. and fired at a temperature of 1,400 to 1,700° C. in a nitrogen-containing inert gas atmosphere or a nitrogen-containing reducing gas atmosphere while flowing the compound in a continuous firing furnace.

In the present invention, it has been found that by firing the raw material while flowing it and in addition, by adjusting the temperature rising rate in a specific temperature range to a specific range, even when a raw material having small RS/RO which has been conventionally incapable of giving a silicon nitride powder having a particle configuration and a specific surface area suitable for sintering is used, a silicon nitride powder suitable for sintering can be obtained, and further found that the content ratio of internal oxygen relative to the specific surface area of the silicon nitride powder can be reduced.

Even in a conventional method of housing an amorphous Si—N(—H)-based compound as the raw material in a crucible or the like and firing the raw material without flowing it in a batch furnace, a pusher furnace, etc., or a method of firing the raw material while flowing it in a continuous firing furnace, the silicon nitride powder of the present invention cannot be obtained by the conventional method using a raw material having RS/RO of less than 500. This is described below.

In the case of a conventional method of firing the raw material without flowing it, compared with the method of firing the raw material while flowing it, as described below, an amorphous Si—N(—H)-based compound having a relatively large oxygen amount needs to be used so as to increase the specific area and therefore, the ratio of internal oxygen relative to the specific surface area of the silicon nitride powder obtained can be hardly reduced. In the method of housing an amorphous Si—N(—H)-based compound as the raw material in a crucible or the like and firing the raw material without flowing it in a batch furnace, a pusher furnace, etc., as described above, because of difficulty in efficiently dissipating the heat of crystallization, the temperature of the silicon nitride powder in the crystallization process locally rises abruptly due to the heat of crystallization, and the produced silicon nitride powder is likely to be partially or wholly crystallized as a columnar crystal or a needle-like crystal. In this case, the silicon nitride powder can be prevented from crystallization as a columnar crystal or a needle-like crystal by forming the amorphous Si—N(—H)-based compound into a granular shape to improve the heat transfer and reducing the temperature rising rate at the time of firing (Patent Document 4), but the specific surface area of the obtained silicon nitride powder becomes small due to the reduced temperature rising rate. When the temperature rising rate during firing is low, compared with a high temperature rising rate, nucleus growth proceeds, though the nucleation temperature of silicon nitride is not changed, and the silicon nitride particle becomes large. In order to obtain a silicon nitride powder having a large specific surface area at a low temperature rising rate, an amorphous Si—N(—H)-based compound having a small specific surface area and a high content ratio of oxygen needs to be used as the raw material to increase the degree of supersaturation. The reason therefor is considered as follows.

In the step of firing an amorphous Si—N(—H)-based compound, the Si source gas species (particularly SiO) evolved from the raw material surface promotes the nucleation and growth of silicon nitride. When the specific surface area of the raw material is small, the vapor pressure of SiO is low at the low temperature of the firing step, and the SiO concentration is increased at a high temperature, as a result, the degree of supersaturation near the particle is elevated at the high temperature, causing nucleation of silicon nitride. When nucleation occurs at a high temperature, not only the number of nuclei generated is increased but also the growth proceeds in a short time, and therefore, the silicon nitride particle becomes small. Furthermore, when the oxygen content ratio of the raw material is high, the nucleation temperature becomes high and similarly to the case where the degree of saturation near the particle during nucleation is high and the specific surface area of the raw material is small, the silicon nitride particle is considered to be small. Accordingly, for obtaining a silicon nitride powder having a specific surface area suitable for sintering by the conventional method of firing the raw material without flowing it, where firing at a low temperature rising rate is required, a raw material having a small specific surface area and at the same time, having a large oxygen amount must be used.

However, when an amorphous Si—N(—H)-based compound having a high oxygen content ratio is used as the raw material, the oxygen content ratio inside the obtained silicon nitride particle becomes high. Accordingly, in the silicon nitride powder having a specific surface area suitable for sintering, which is obtained by the conventional method of firing the raw material without flowing it, the oxygen content ratio inside the particle becomes high, compared with a silicon nitride powder having the same specific surface area, which is obtained by firing the raw material while flowing it.

As described above, in the conventional method of firing the raw material without flowing it, the content ratio of internal oxygen relative to the specific surface area of the obtained silicon nitride powder becomes high, compared with the case of firing the raw material while flowing it, and in turn, a silicon nitride powder having large FS/FIO can not be easily obtained, making it impossible to obtain the silicon nitride powder of the present invention.

Even in the case of a method of firing the raw material while flowing the compound, it has not been heretofore known that by setting the temperature rising rate in a specific temperature range to a specific range, a silicon nitride powder having good sinterability is obtained despite use of a raw material in which the content ratio of internal oxygen relative to the specific surface area is not more than a given ratio, and therefore, as described, for example, in Patent Document 5, a raw material having a high content ratio of internal oxygen relative to the specific surface area, that is, a raw material having RS/RO of less than 500, has been used. Accordingly, even in the case of a method of firing the raw material while flowing it, the silicon nitride powder of the present invention cannot be obtained by the conventional production method.

The silicon nitride powder of the present invention is a silicon nitride powder having a specific surface area and FS/FSO suitable for sintering and in addition, having large FS/FIO, which is obtained, for the first time, by the production method of the present invention developed based on the finding that by firing the raw material while flowing it and in addition, by adjusting the temperature rising rate in a specific temperature range to a specific range, even when a raw material having a high content ratio of internal oxygen relative to the specific surface area is used, a silicon nitride powder suitable for sintering can be obtained, and further the finding that the content ratio of internal oxygen relative to the specific surface area of the silicon nitride powder can be reduced.

The silicon nitride powder of the present invention has excellent sinterability, and a silicon nitride sintered body obtained by sintering the silicon nitride powder of the present invention is characterized by exhibiting excellent mechanical properties at room temperature as well as at a high temperature and having high thermal conductivity. Although not limited to the followings, the silicon nitride sintered body obtained by sintering the silicon nitride powder of the present invention can have a relative density of 99.0% or more and when produced and evaluated in the later-described "Production and Evaluation Method of Sintered Body for High-Temperature Structural Member", can have a room-temperature bending strength of 1,000 MPa or more and a 1,200° C. bending strength of 600 MPa or more, and furthermore, a room-temperature bending strength of 1,100 MPa or more and a 1,200° C. bending strength of 700 MPa or more. The silicon nitride sintered body obtained by sintering the silicon nitride powder of the present invention when produced and evaluated in the later-described "Production and Evaluation Method of Sintered Body for Circuit Substrate", can have a room-temperature bending strength of 600 MPa or more and a 25° C. thermal conductivity coefficient of 100 W/mK or more, furthermore, a room-temperature bending strength of 650 MPa or more and a 25° C. thermal conductivity coefficient of 130 W/mK or more.

Incidentally, the above-described pusher furnace is a firing furnace equipped with a furnace chamber capable of controlling the temperature and atmosphere conditions, where a plurality of trays each having thereon a crucible or the like housing a ceramic raw material as a material to be fired are pushed sequentially into a furnace by a pusher mechanism and transported to thereby perform firing of the material to be fired.

The content ratio of surface oxygen and the content ratio of internal oxygen of the silicon nitride powder according to the present invention can be measured by the following method. First, the silicon nitride powder is weighed, and FTO (mass %) as a content ratio of the entire oxygen, which is a total of surface oxygen and internal oxygen of the silicon nitride powder, is measured by an inert gas fusion-carbon dioxide infrared absorption method (Model TC-136, manufactured by LECO) in conformity with the oxygen quantification method of JIS R1603-10. Next, the weighed silicon nitride powder is subjected to mixing of the silicon nitride powder and an aqueous hydrofluoric acid solution such that hydrogen fluoride accounts for 5 parts by mass per parts by mass of the silicon nitride powder, and stirred at room temperature for 3 hours. A solid material obtained by suction filtration is vacuum-dried at 120° C. for 1 hour, and the weight of this hydrofluoric acid-treated powder is measured. The oxygen content of the obtained powder is measured by an infrared absorption spectrum method, and this value is taken as FIO before correction (mass % based on the hydrofluoric acid-treated powder). The content ratio FIO (mass % based on the silicon nitride powder) of internal oxygen is calculated according to the following formula (3). The content ratio FSO (mass % based on the silicon nitride powder) of surface oxygen is calculated according to the following formula (4). The thus-determined surface oxygen is confirmed to be attributable to oxygen existing in a range from the particle surface to 3 nm beneath the particle surface, by the X-ray photoelectron spectroscopy depth profile for the powder before and after the hydrofluoric acid treatment and the change in weight of the powder between before and after the treatment.

FIO (mass %)=((weight of hydrofluoric acid-treated powder)(g))/(weight of silicon nitride powder (g))×FIO before correction (mass %)    (3)

FSO (mass %)=FTO (mass %)−FIO (mass %)    (4)

The oxygen content ratio of the amorphous Si—N(—H)-based compound according to the present invention is also measured, similarly to the silicon nitride powder, by an inert gas melting-carbon dioxide infrared absorption method (Model TC-136, manufactured by LECO) in conformity with the oxygen quantification method of JIS R1603-10, but in order to suppress oxidation of the amorphous Si—N(—H)- based compound, the atmosphere during sample storage until immediately before measurement and during measurement is set to a nitrogen atmosphere.

The silicon nitride sintered body according to the present invention and a circuit substrate using the same are described below.

The silicon nitride sintered body according to the present invention is produced by the following production method. The silicon nitride powder of the present invention and a sintering aid are mixed, the obtained mixed powder is molded, and the obtained compact is further sintered, whereby the silicon nitride sintered body for a high-temperature structural member according to the present invention can be produced. Alternatively, the silicon nitride sintered body for a high-temperature structural member according to the present invention can be produced while simultaneously performing the molding and the sintering.

The silicon nitride is a sintering retardant material and therefore, the sintered body is usually produced while promoting the sintering by a sintering aid. As for the silicon nitride sintered body, since a high-temperature stable β-type columnar crystal precipitates in the sintering process, most of silicon nitride crystal grains in the sintered body are a β-type columnar crystal. The microstructure, such as aspect ratio and grain size of the β-type columnar crystal, is greatly affected not only by the raw material silicon nitride powder but also by the kind and amount added of the sintering aid and the sintering conditions and therefore, these factors are appropriately selected according to physical properties of the powder and the properties required of the silicon nitride sintered body.

For achieving a high mechanical strength of the silicon nitride sintered body, the structure of the silicon nitride sintered body is preferably a microstructure where the aspect ratio of the β-type columnar crystal is high, and as the sintering aid in this case, magnesium oxide, aluminum oxide and yttrium oxide are generally used in an appropriate combination. Among others, in the production of a silicon nitride sintered body for a high-temperature structural member requiring high-temperature strength, such as gas turbine member, a rare earth oxide such as ytterbium oxide effective in elevating the heat resistance of the grain boundary phase is sometimes further used in combination with the sintering aid.

On the other hand, for achieving a high coefficient of thermal conductivity of the silicon nitride sintered body, it is effective to increase the ratio of β-type crystal and increase the purity and dimension of β-type crystal. While the α-type crystal of silicon nitride has a complicated layered structure, the β-type crystal has a relatively simple layered structure to hardly cause phonon scattering in the β-type crystal and furthermore, the atomic arrangement of the β-type crystal is less disordered and has high continuity, leading to good thermal conduction. However, such a crystal configuration (a large crystal grain dimension) and the mechanical strength of the silicon nitride sintered body are likely to fall in trade-off relationship, and therefore, an aid capable of forming a structure where β-type crystals having an appropriate grain size are complicatedly entangled, and capable of achieving densification with a minimal amount of a grain boundary phase is selected appropriately in an appropriate amount from the aids described above.

In the present invention, aids such as yttrium oxide, lanthanoid rare-earth oxide and magnesium oxide can be used individually or in appropriate combination according to the purpose. In addition, a magnesium compound such as $MgSiN_2$ and $Mg_2Si$, titanium oxide, zirconium oxide, lithium oxide, boron oxide, calcium oxide and the like can be used individually or in appropriate combination with at least one member of yttrium oxide, lanthanoid rare-earth oxide, magnesium oxide and the like.

The method for mixing the silicon nitride powder of the present invention and a sintering aid may be any method irrespective of wet or dry process as long as it is a method capable of uniformly mixing these powders, and a known method such as rotary mill, barrel mill and vibration mill can be used. For example, a method where the silicon nitride powder, a sintering aid, a binder for molding and a dispersant are mixed in a ball mill by using water or the like as the dispersion medium and then spray-dried and the mixed powder is formed into a granular shape, may be employed.

As the method for molding the mixed powder, a known method such as press molding, cast molding, extrusion molding, injection molding, sludge molding and cold isostatic molding can be used. For example, CIP (cold isostatic press) molding of filling a rubber-made mold with the obtained granular mixed powder and applying a pressure thereon to obtain a compact may be employed.

The sintering method of the compact may be any method as long as it is method capable of densifying the obtained sintered body, but normal pressure sintering in an inert gas atmosphere, or gas pressure sintering where the gas pressure in the atmosphere is raised to approximately from 0.2 to 10 MPa, is employed. In general, sintering is performed using nitrogen gas at a temperature of 1,700 to 1,800° C. in normal pressure sintering and at a temperature of 1,800 to 2,000° C. in gas pressure sintering.

In addition, hot press sintering that is a method of performing the molding and the sintering at the same time may also be employed. The sintering by a hot press is usually performed in a nitrogen atmosphere under a pressure of 0.2 to 10 MPa at a sintering temperature of 1,950 to 2,050° C.

The strength can be further enhanced by subjecting the obtained silicon nitride sintered body to HIP (hot isostatic press) treatment. The HIP treatment is usually performed in a nitrogen atmosphere under a pressure of 30 to 200 MPa at a sintering temperature of 2,100 to 2,200° C.

The circuit substrate according to the present invention is produced by the following method. The circuit substrate is a plate-like component having formed on the surface thereof an electronic circuit, or a component (not including an electronic component) for forming an electronic circuit on the surface.

The circuit substrate according to the present invention can be produced, for example, by machining the silicon nitride sintered body of the present invention by grinding, etc., connecting a metal sheet, etc., to the obtained plate-like sintered body, and removing a part of the metal sheet by etching, etc., to form a conductor circuit pattern on the surface of the plate-like sintered body.

Other methods include the following method. A sintering aid, an organic binder and the like are added to the silicon nitride powder of the present invention to prepare a raw material mixture, and the obtained raw material mixture is molded by a sheet molding method such as doctor blade method to obtain a compact (green sheet). Thereafter, a paste for conductor formation is screen-printed on the compact surface to form a conductor circuit pattern in a predetermined shape. The organic binder is removed by degreasing treatment, and the obtained compact having formed thereon a pattern is fired in an inert atmosphere, whereby the circuit substrate according to the present invention can be produced.

EXAMPLES

The present invention is described in detail below by referring to Examples, but the present invention is not limited to these Examples.

(Composition Analysis Method of Amorphous Si—N(—H)-based Compound)

The silicon (Si) content of the amorphous Si—N(—H)-based compound was measured by ICP emission analysis in conformity with the total silicon quantification method of JIS R1603-7, the nitrogen (N) content was measured by a water vapor distillation/separation-neutralization titration method in conformity with the total nitrogen quantification method of JIS R1603-8, and the oxygen (O) content was measured by the above-described inert gas fusion-carbon dioxide infrared absorption method in conformity with the oxygen quantification method of JIS R1603-10. However, in order to suppress oxidation of the amorphous Si—N(—H)-based compound, the atmosphere during sample storage until immediately before a pretreatment of the sample for measurement was set to a nitrogen atmosphere in the case of measuring the silicon/nitrogen contents by ICP emission analysis or a water vapor distillation/separation-neutralization titration method, and the atmosphere during sample storage until immediately before measurement and during measurement was set to a nitrogen atmosphere in the case of measuring the oxygen content by an infrared absorption method. The hydrogen (H) content of the amorphous Si—N(—H)-based compound was determined by calculating it, based on a stoichiometric composition, as a residue after removing silicon (Si), nitrogen (N) and oxygen (O) contents from the total amount of the amorphous Si—N(—H)-based compound. From the values obtained, the ratio of Si, N and H was obtained, and the composition formula of the amorphous Si—N(—H)-based compound was determined.

(Measuring Methods of Specific Surface Area and Particle Size Distribution)

The specific surface areas of the silicon nitride powder and amorphous Si—N(—H)-based compound were measured by a nitrogen adsorption BET one-point method (Flowsorb 2300, manufactured by Shimadzu Corporation), and the particle size distribution was measured by a laser diffraction/scattering particle diameter distribution analyzer (LA-950, manufactured by Horiba, Ltd.)

(Measuring Method of Crystallization Degree)

The accurately weighed silicon nitride powder was added to an aqueous 0.5 N NaOH solution and heated at 100° C. The $NH_3$ gas evolved by the decomposition of silicon nitride was absorbed by an aqueous 1% boric acid solution, and the $NH_3$ amount in the absorbing solution was titrated with a 0.1 N sulfuric acid standard solution. The decomposed nitrogen amount was calculated from the $NH_3$ amount in the absorbing solution. The crystallization degree was calculated from the decomposed nitrogen amount and the theoretical nitrogen amount of 39.94% of silicon nitride according to the following formula (5):

$$\text{Crystallization degree (\%)} = 100 - (\text{decomposed nitrogen amount} \times 100/39.94) \quad (5)$$

(Measuring Method of Metallic Silicon Content Percentage)

The metallic silicon (metal silicon) of the silicon nitride powder was measured by a hydrogen gas generation-gas volume method in conformity with the free silicon quantification method of JIS R1616-9 which is applied to a free silicon content percentage of 0.01 to 1 mass %.

(Production and Evaluation Method of Sintered Body for High-Temperature Structural Member)

A compounded powder prepared by adding, as the sintering aid, 5 parts by mass of yttrium oxide and 2 parts by mass of aluminum oxide to 93 parts by mass of the silicon nitride powder was wet mixed in a ball mill for 48 hours by using ethanol as the medium and then dried under reduced pressure. The obtained mixture was subjected to metallic molding into a shape of 6×45×75 mm under a molding pressure of 50 MPa and then to CIP molding under a molding pressure of 150 MPa. The obtained compact was placed in a silicon nitride-made crucible and sintered at 1,780° C. for 2 hours in a nitrogen gas atmosphere. The obtained sintered body was processed by cutting and polishing to produce a test piece of 3 mm×4 mm×40 mm in accordance with JIS R1601. The relative density of the sintered body was measured using the Archimedes method. The room-temperature bending strength and high-temperature bending strength at 1,200° C. were measured using a universal material tester manufactured by Instron Corporation by the method in accordance with JIS R1601.

(Production and Evaluation Method of Sintered Body for Circuit Substrate)

A compounded powder prepared by adding, as the sintering aid, 3.5 parts by mass of yttrium oxide and 2 parts by mass of magnesium oxide to 94.5 parts by mass of the silicon nitride powder was wet mixed in a ball mill for 12 hours by using ethanol as the medium and then dried under reduced pressure. The obtained mixture was subjected to metallic molding into a shape of 12.3 mmφ×3.2 mm under a molding pressure of 50 MPa and then to CIP molding under a molding pressure of 150 MPa. The obtained compact was placed in a boron nitride-made crucible and sintered at 1,900° C. for 22 hours in a pressurized nitrogen gas atmosphere of 0.8 MPa. The obtained sintered body was processed by cutting and polishing to produce a bending test piece of 3 mm×4 mm×40 mm in accordance with JIS R1601 and a test peace of 10 mmφ×2 mm for the measurement of thermal conductivity coefficient in accordance with JIS R1611. The relative density of the sintered body was measured using the Archimedes method. The room-temperature bending strength was measured using a universal material tester manufactured by Instron Corporation by the method in accordance with JIS R1601, and the coefficient of thermal conductivity at room temperature was measured by the flash method in accordance with JIS R1611.

Example 1

The air in a vertical pressure-resistant reaction tank with a diameter of 40 cm and a height of 60 cm kept at 20° C. was purged with nitrogen gas and thereafter, 40 liter of liquid ammonia and 5 liter of toluene was charged into the reaction tank. In the reaction tank, the liquid ammonia and toluene were slowly stirred to cause separation into an upper layer of liquid ammonia and a lower layer of toluene. A previously prepared solution (reaction solution) consisting of 2 liter of silicon tetrachloride and 6 liter of toluene containing 0.1 mass % water was fed through an introduction tube to the lower layer inside the stirring tank having slow stirring. At this time, the volume ratio between silicon tetrachloride fed into the reaction tank and liquid ammonia in the reaction tank was 5/100. Along with feeding of the solution above, a white reaction produce was precipitated near the interface of upper and lower layers. After the completion of reaction, the reaction product and residual solution in the reaction tank were transferred to a filtration tank, and the reaction produce was separated by filtration and batch-washed four times with liquid ammonia to obtain about 1 kg of silicon diimide having a specific surface area of 1,400 $m^2/g$.

The obtained silicon diimide was packed in a raw material hopper of a rotary kiln furnace with a diameter of 150 mm and a length of 2,800 mm (heating length: 1,000 mm), the inside of the rotary kiln furnace was vacuum-deaerated to 13 Pa or less, a nitrogen gas containing 2% of oxygen was introduced in a total gas flow rate of 250 NL/hour, and heating was started. Upon reaching the maximum temperature (1,000° C.) in the rotary kiln furnace, a raw material-feeding screw feeder was rotated, and silicon diimide was fed from the raw material hopper into the furnace at a powder processing rate of 3 kg/hour. The silicon diimide was heated under the conditions of a tilt angle of kiln of 2°, a rotation speed of 1 rpm and a holding time at the maximum temperature of 10 minutes to obtain an amorphous Si—N(—H)-based compound according to Example 1 shown in Table 1, represented by the composition formula $Si_6N_{8.4}H_{1.2}$, i.e., when x in the formula $Si_6N_{2x}(NH)_{12-3x}$ is 3.6.

Subsequently, the obtained amorphous Si—N(—H)-based compound was packed in a raw material hopper of a rotary kiln furnace having a silicon carbide-made furnace tube with an inner diameter of 114 mm and a length of 1,780 mm. The inside of the rotary kiln furnace was sufficiently purged with nitrogen gas, the temperature was raised in a nitrogen gas flow atmosphere (oxygen concentration: less than 100 ppm) until the maximum temperature portion in the furnace reaches the firing temperature shown in Table 1, and after the temperature distribution in the furnace was stabilized, the raw material-feeding screw feeder was rotated to feed the amorphous Si—N(—H)-based compound into the furnace from the raw material hopper at a powder processing rate of 2 kg/hour. The amorphous Si—N(—H)-based compound was heated by setting the rotation speed of the furnace tube to 2 rpm and controlling the furnace tube tilt angle to adjust the powder transfer rate in the furnace tube such that the temperature rising rate of the powder in a temperature range from 1,000 to 1,400° C. becomes 40° C./min, and fired at 1,500° C. to produce the silicon nitride powder of Example 1.

Metallic silicon was not detected from the obtained silicon nitride powder. That is, the metallic silicon content percentage of the obtained silicon nitride powder was less than 0.01 mass %.

Examples 2 to 12 and Comparative Examples 1 to 14

Amorphous Si—N(—H)-based compounds according to Examples 2 to 12 and Comparative Examples 1 to 14 shown in Table 1 were obtained by the same method as in Example 1 except that the water amount of toluene in the reaction solution fed to the lower layer of the reaction tank at the time of synthesis of silicon diimide and the oxygen content ratio of nitrogen gas introduced into the furnace at the time of decomposition of silicon diimide were appropriately adjusted in a range of 0.01 to 0.5 mass % and in a range of 0.1 to 5%, respectively, so as to control the oxygen content ratio of the obtained amorphous Si—N(—H)-based compound and the maximum temperature of the furnace was adjusted in a range of 800 to 1,100° C. so as to control the specific surface area of the obtained amorphous Si—N(—H)-based compound. Incidentally, x in the composition formula $Si_6N_{2x}(NH)_{12-3x}$ of amorphous Si—N(—H)-based compounds according to Examples 2 to 12 was, in order starting from Example 2, 2.7, 2.8, 1.1, 0.6, 2.6, 2.6, 2.8, 3.5, 2.7, 2.8, and 0.8, and x in the composition formula $Si_6N_{2x}(NH)_{12-3x}$ of amorphous Si—N (—H)-based compounds according to Comparative Examples 1 to 14 was, in order starting from Comparative Example 1, 3.8, 0.6, 0.6, 3.5, 3.4, 2.7, 2.6, 0.8, 2.7, 2.6, 2.9, 2.8, 3.8, and 3.8. In this connection, x in composition formula $Si_6N_{2x}(NH)_{12-3x}$ of amorphous Si—N(—H)-based compounds according to Comparative Examples 15 to 17 was, in order starting from Comparative Example 15, 3.5, 2.4, and 2.9. Thereafter, the amorphous Si—N(—H)-based compound was fired in a rotary kiln furnace by the same method as in Example 1 except that these amorphous Si—N(—H)-based compounds were used as the raw material and the temperature rising rate in a temperature range from 1,000 to 1,400° C. and the firing temperature were adjusted as shown in Table 1, whereby silicon nitride powders of Examples 2 to 12 and Comparative Examples 1 to 14 were produced.

Metallic silicon was not detected from the obtained silicon nitride powders. That is, the metallic silicon content percentage of the obtained silicon nitride powders was less than 0.01 mass %.

Comparative Example 15

The silicon nitride powder of Comparative Example 15 shown in Table 1 was produced by the following method. The same amorphous Si—N(—H)-based compound as the amorphous Si—N(—H)-based compound according to Comparative Example 4 was packed in a graphite-made crucible having an inner diameter of 280 mm and a height of 150 mm, and the crucible was set in a pusher furnace. The inside of the pusher furnace was sufficiently purged with nitrogen gas and then, the temperature was raised to 1,500° C. in a nitrogen gas flow atmosphere. The crucible transportation speed was adjusted such that the powder is heated at a temperature rising rate of 4° C./min in a temperature range from 1,000 to 1,400° C., whereby the silicon nitride powder of Comparative Example 15 was produced.

Metallic silicon was not detected from the obtained silicon nitride powder. That is, the metallic silicon content percentage of the obtained silicon nitride powder was less than 0.01 mass %.

Comparative Examples 16 and 17

The amorphous Si—N(—H)-based compound was fired under the same conditions as in Comparative Example 15 by using the same pusher furnace as in Comparative Example 15 except that the same amorphous Si—N(—H)-based compounds as the amorphous Si—N(—H)-based compounds according to Examples 10 and 11 were used as the raw material, whereby silicon nitride powders of Comparative Examples 16 and 17 were produced, respectively.

The specific surface area, FS/FSO value, FS/FIO value, particle size distribution, crystallization degree and particle shape of each of the obtained silicon nitride powders of Examples 1 to 12 and Comparative Examples 1 to 15 were as shown in Table 2.

Metallic silicon was not detected from the obtained silicon nitride powders. That is, the metallic silicon content percentage of the obtained silicon nitride powders was less than 0.01 mass %.

Examples 1-1 to 12-1 and Comparative Examples 1-1 to 17-1

Sintered bodies for a high-temperature structural member were produced and evaluated according to the method described in (Production and Evaluation Method of Sintered Body for High-Temperature Structural Member) above by using, as shown in Table 3, silicon nitride powders obtained in Examples 1 to 9 and Comparative Examples 1 to 6 as raw materials of Examples 1-1 to 12-1 and Comparative Examples 1-1 to 17-1. Furthermore, the relative density, room-temperature bending strength and high-temperature bending strength of each of those sintered bodies for a high-temperature structural member are shown in Table 3.

Examples 1-2 to 12-2 and Comparative Examples 1-2 to 17-2

Sintered bodies for measurement of thermal conductivity coefficient were produced and evaluated according to the method described in (Production and Evaluation Method of Sintered Body for Circuit Substrate) above by using, as shown in Table 4, silicon nitride powders obtained in Examples 1 to 12 and Comparative Examples 1 to 15 as raw materials of Examples 1-2 to 12-2 and Comparative Examples 1-2 to 17-2. Furthermore, the relative density, room-temperature bending strength and thermal conductivity coefficient of each of those sintered bodies for measurement of thermal conductivity coefficient are shown in Table 4.

The silicon nitride powder of the present invention has an appropriate content ratio of surface oxygen, and therefore is easily sinterable, and in turn, a sintered body obtained by sintering the silicon nitride powder of the present invention has a large relative density and a high room-temperature strength. Furthermore, the silicon nitride powder of the present invention has a low content ratio of internal oxygen, and in turn, a sintered body obtained by sintering the silicon nitride powder of the present invention has an elevated high-temperature strength and a high coefficient of thermal conductivity.

As a result of the silicon nitride powder of the present invention, a silicon nitride sintered body exhibiting excellent mechanical properties at room temperature, as well as at a high temperature and a silicon nitride sintered body having both high thermal conductivity coefficient and excellent mechanical properties are provided.

In addition, according to the present invention, a circuit substrate excellent in heat dissipation property and mechanical strength is provided.

TABLE 1

| | Raw Material (amorphous Si—N(—H)-based Compound) | | | Firing Conditions | | |
|---|---|---|---|---|---|---|
| | Specific Surface Area (RS) $m^2/g$ | Oxygen Content Ratio (RO) mass % | RS/RO | Firing Furnace | Firing Temperature °C. | Temperature Rising Rate °C./min |
| Example 1 | 450 | 0.73 | 616 | rotary kiln furnace | 1500 | 40 |
| Example 2 | 700 | 0.41 | 1707 | | 1500 | 40 |
| Example 3 | 700 | 0.70 | 1000 | | 1500 | 40 |
| Example 4 | 1150 | 0.45 | 2556 | | 1500 | 40 |
| Example 5 | 1150 | 1.90 | 605 | | 1500 | 40 |
| Example 6 | 700 | 1.00 | 700 | | 1500 | 17 |
| Example 7 | 700 | 1.00 | 700 | | 1450 | 40 |
| Example 8 | 700 | 0.34 | 2059 | | 1650 | 40 |
| Example 9 | 450 | 0.12 | 3750 | | 1500 | 12 |
| Example 10 | 700 | 0.14 | 5000 | | 1500 | 17 |
| Example 11 | 700 | 0.62 | 1129 | | 1500 | 55 |
| Example 12 | 1150 | 1.80 | 639 | | 1500 | 70 |
| Comparative Example 1 | 330 | 0.54 | 611 | rotary kiln furnace | 1500 | 40 |
| Comparative Example 2 | 1300 | 0.90 | 1444 | | 1500 | 40 |
| Comparative Example 3 | 1300 | 0.86 | 1512 | | 1500 | 17 |
| Comparative Example 4 | 450 | 1.03 | 437 | | 1500 | 40 |
| Comparative Example 5 | 480 | 1.51 | 318 | | 1500 | 40 |
| Comparative Example 6 | 700 | 2.30 | 304 | | 1500 | 40 |
| Comparative Example 7 | 700 | 1.76 | 398 | | 1500 | 40 |
| Comparative Example 8 | 1150 | 2.49 | 462 | | 1500 | 40 |
| Comparative Example 9 | 700 | 1.13 | 619 | | 1350 | 40 |
| Comparative Example 10 | 700 | 1.13 | 619 | | 1750 | 40 |
| Comparative Example 11 | 700 | 1.00 | 700 | | 1500 | 10 |
| Comparative Example 12 | 700 | 1.00 | 700 | | 1500 | 110 |
| Comparative Example 13 | 330 | 1.04 | 317 | | 1500 | 40 |
| Comparative Example 14 | 330 | 1.04 | 317 | | 1500 | 17 |
| Comparative Example 15 | 450 | 1.03 | 437 | pusher furnace | 1500 | 1 |
| Comparative Example 16 | 700 | 0.14 | 5000 | | 1500 | 1 |
| Comparative Example 17 | 700 | 0.62 | 1129 | | 1500 | 1 |

TABLE 2

| | Properties of Crystalline Silicon Nitride Powder | | | | | | | | | | | |
|---|---|---|---|---|---|---|---|---|---|---|---|---|
| | Specific Surface Area (FS) m²/g | Entire Oxygen (FTO) mass % | Surface Oxygen (FSO) mass % | Internal Oxygen (FIO) mass % | FS/FSO (—) | FS/FIO (—) | 10 Vol % Diameter (D10) μm | 50 Vol % Diameter (D50) μm | 90 Vol % Diameter (D90) μm | D10/D90 (—) | Crystallization Degree (%) | Particle Shape (—) |
| Example 1 | 21.6 | 1.4 | 0.88 | 0.52 | 24.5 | 41.5 | 0.37 | 0.58 | 2.14 | 0.17 | 100 | granular crystal |
| Example 2 | 14.5 | 1.2 | 0.75 | 0.48 | 19.4 | 30.1 | 0.40 | 0.70 | 2.20 | 0.18 | 100 | granular crystal |
| Example 3 | 16.9 | 1.5 | 0.88 | 0.57 | 19.2 | 29.6 | 0.40 | 0.62 | 2.47 | 0.16 | 100 | granular crystal |
| Example 4 | 10.4 | 1.1 | 0.71 | 0.34 | 14.6 | 30.9 | 0.48 | 0.82 | 2.43 | 0.20 | 100 | granular crystal |
| Example 5 | 27.8 | 2.0 | 1.13 | 0.89 | 24.6 | 31.2 | 0.31 | 0.58 | 2.79 | 0.11 | 100 | granular crystal |
| Example 6 | 12.8 | 1.2 | 0.79 | 0.43 | 16.2 | 29.8 | 0.46 | 0.77 | 2.33 | 0.20 | 100 | granular crystal |
| Example 7 | 16.4 | 1.3 | 0.77 | 0.52 | 21.3 | 31.5 | 0.39 | 0.59 | 2.21 | 0.18 | 100 | granular crystal |
| Example 8 | 13.2 | 1.2 | 0.73 | 0.48 | 18.0 | 27.7 | 0.47 | 0.79 | 2.44 | 0.19 | 100 | granular crystal |
| Example 9 | 5.6 | 0.9 | 0.62 | 0.24 | 9.0 | 23.3 | 0.52 | 0.95 | 3.01 | 0.17 | 100 | granular crystal |
| Example 10 | 6.4 | 1.0 | 0.70 | 0.28 | 9.1 | 22.9 | 0.49 | 0.88 | 2.89 | 0.17 | 100 | granular crystal |
| Example 11 | 19.8 | 1.4 | 0.87 | 0.50 | 22.8 | 39.6 | 0.36 | 0.57 | 2.35 | 0.15 | 100 | granular crystal |
| Example 12 | 28.9 | 1.6 | 1.18 | 0.41 | 24.5 | 71.2 | 0.33 | 0.65 | 2.74 | 0.12 | 100 | granular crystal |
| Comparative Example 1 | 16.7 | 1.3 | 0.68 | 0.64 | 24.6 | 26.1 | 0.41 | 0.86 | 5.01 | 0.08 | 100 | needle-like crystal |
| Comparative Example 2 | 9.8 | 0.9 | 0.36 | 0.52 | 27.2 | 18.8 | 0.50 | 0.92 | 2.45 | 0.20 | 100 | granular crystal |
| Comparative Example 3 | 8.3 | 0.9 | 0.37 | 0.48 | 22.4 | 17.3 | 0.53 | 0.99 | 2.78 | 0.19 | 100 | granular crystal |
| Comparative Example 4 | 23.3 | 1.9 | 0.73 | 1.14 | 31.9 | 20.4 | 0.33 | 0.87 | 2.56 | 0.13 | 100 | granular crystal |
| Comparative Example 5 | 27.7 | 2.1 | 0.76 | 1.32 | 36.4 | 21.0 | 0.32 | 0.86 | 2.45 | 0.13 | 100 | needle-like crystal |
| Comparative Example 6 | 34.8 | 2.7 | 1.04 | 1.62 | 33.5 | 21.5 | 0.33 | 0.83 | 2.50 | 0.13 | 100 | needle-like crystal |
| Comparative Example 7 | 24.6 | 2.3 | 0.97 | 1.30 | 25.4 | 18.9 | 0.36 | 0.90 | 2.80 | 0.13 | 100 | needle-like crystal |
| Comparative Example 8 | 33.6 | 2.8 | 1.08 | 1.67 | 31.1 | 20.1 | 0.37 | 0.86 | 2.83 | 0.13 | 100 | needle-like crystal |
| Comparative Example 9 | 42.3 | 2.2 | 1.30 | 0.90 | 32.5 | 47.0 | 0.43 | 0.76 | 3.98 | 0.11 | 70 | granular crystal and amorphous Si—N—H-based compound |
| Comparative Example 10 | 13.1 | 1.0 | 0.49 | 0.50 | 27.0 | 26.0 | 0.49 | 0.98 | 6.56 | 0.07 | 100 | fused granular crystal |
| Comparative Example 11 | 8.1 | 1.3 | 0.77 | 0.50 | 10.5 | 16.2 | 0.48 | 0.97 | 3.01 | 0.16 | 100 | granular crystal |
| Comparative Example 12 | 33.4 | 1.3 | 0.64 | 0.67 | 52.2 | 49.9 | 0.37 | 0.71 | 5.57 | 0.07 | 100 | needle-like crystal |
| Comparative Example 13 | 23.8 | 1.5 | 0.90 | 0.55 | 26.4 | 43.3 | 0.38 | 0.86 | 4.87 | 0.08 | 100 | needle-like crystal |
| Comparative Example 14 | 18.4 | 1.4 | 0.82 | 0.57 | 22.4 | 32.3 | 0.39 | 0.89 | 4.77 | 0.08 | 100 | needle-like crystal |
| Comparative Example 15 | 9.2 | 1.9 | 0.83 | 1.02 | 11.1 | 9.0 | 0.56 | 1.01 | 2.99 | 0.19 | 100 | granular crystal |
| Comparative Example 16 | 3.1 | 1.0 | 0.72 | 0.31 | 4.3 | 10.0 | 0.78 | 1.43 | 3.67 | 0.21 | 100 | granular crystal |
| Comparative Example 17 | 4.1 | 1.4 | 0.71 | 0.69 | 5.8 | 5.9 | 0.59 | 1.12 | 3.02 | 0.20 | 100 | granular crystal |

TABLE 3

| | Characteristics of Sintered Body | | |
|---|---|---|---|
| | Relative Density % | Bending Strength (room temperature) MPa | Bending Strength (1200° C.) MPa |
| Example 1-1 | 99.3 | 1080 | 750 |
| Example 2-1 | 99.4 | 1120 | 740 |
| Example 3-1 | 99.5 | 1180 | 740 |
| Example 4-1 | 99.6 | 1220 | 720 |
| Example 5-1 | 99.4 | 1090 | 760 |
| Example 6-1 | 99.5 | 1170 | 730 |
| Example 7-1 | 99.4 | 1100 | 740 |
| Example 8-1 | 99.6 | 1130 | 730 |
| Example 9-1 | 99.4 | 1020 | 710 |
| Example 10-1 | 99.7 | 1050 | 700 |
| Example 11-1 | 99.6 | 1110 | 740 |
| Example 12-1 | 99.3 | 1020 | 710 |
| Comparative Example 1-1 | 95.5 | 730 | 480 |
| Comparative Example 2-1 | 95.8 | 650 | 510 |
| Comparative Example 3-1 | 96.2 | 790 | 490 |
| Comparative Example 4-1 | 96.0 | 750 | 460 |
| Comparative Example 5-1 | 95.6 | 770 | 450 |
| Comparative Example 6-1 | 95.1 | 760 | 460 |
| Comparative Example 7-1 | 94.9 | 780 | 500 |
| Comparative Example 8-1 | 95.0 | 710 | 480 |
| Comparative Example 9-1 | 92.6 | 590 | 470 |
| Comparative Example 10-1 | 94.0 | 760 | 450 |
| Comparative Example 11-1 | 94.2 | 790 | 520 |
| Comparative Example 12-1 | 93.7 | 670 | 470 |
| Comparative Example 13-1 | 95.3 | 780 | 480 |
| Comparative Example 14-1 | 96.3 | 790 | 490 |
| Comparative Example 15-1 | 99.1 | 1080 | 510 |
| Comparative Example 16-1 | 97.2 | 810 | 480 |
| Comparative Example 17-1 | 97.1 | 790 | 510 |

TABLE 4

| | Characteristics of Sintered Body | | |
|---|---|---|---|
| | Relative Density % | Bending Strength (room temperature) MPa | Coefficient of Thermal Conductivity (25° C.) W/mK |
| Example 1-2 | 99.0 | 660 | 132 |
| Example 2-2 | 99.1 | 650 | 138 |
| Example 3-2 | 99.3 | 650 | 135 |
| Example 4-2 | 99.3 | 640 | 139 |
| Example 5-2 | 99.1 | 660 | 133 |
| Example 6-2 | 99.2 | 625 | 132 |
| Example 7-2 | 99.1 | 645 | 130 |
| Example 8-2 | 99.3 | 645 | 141 |
| Example 9-2 | 99.1 | 605 | 140 |
| Example 10-2 | 99.4 | 610 | 142 |
| Example 11-2 | 99.3 | 655 | 136 |
| Example 12-2 | 99.0 | 650 | 131 |
| Comparative Example 1-2 | 94.5 | 400 | 91 |
| Comparative Example 2-2 | 95.5 | 520 | 98 |
| Comparative Example 3-2 | 95.9 | 540 | 95 |
| Comparative Example 4-2 | 93.6 | 380 | 87 |
| Comparative Example 5-2 | 93.0 | 330 | 80 |
| Comparative Example 6-2 | 93.3 | 320 | 78 |
| Comparative Example 7-2 | 94.0 | 390 | 83 |
| Comparative Example 8-2 | 93.6 | 360 | 85 |
| Comparative Example 9-2 | 92.3 | 320 | 90 |
| Comparative Example 10-2 | 93.7 | 360 | 85 |
| Comparative Example 11-2 | 96.3 | 520 | 78 |
| Comparative Example 12-2 | 93.2 | 290 | 75 |
| Comparative Example 13-2 | 95.0 | 530 | 94 |
| Comparative Example 14-2 | 96.0 | 540 | 99 |
| Comparative Example 15-2 | 99.1 | 630 | 82 |
| Comparative Example 16-2 | 95.0 | 510 | 84 |
| Comparative Example 17-2 | 95.2 | 520 | 86 |

INDUSTRIAL APPLICABILITY

By the production method of a silicon nitride powder of the present invention, a silicon nitride powder being easily sinterable, nevertheless, having a small content ratio of internal oxygen relative to the specific surface area can be obtained, and by sintering this silicon nitride powder, a dense silicon nitride sintered body exhibiting excellent mechanical properties at room temperature as well as at a high temperature, a silicon nitride sintered body having both high thermal conductivity coefficient and excellent mechanical properties, and a circuit substrate using the same can be provided. In addition, according to the production method of a silicon nitride powder of the present invention, a silicon nitride powder having these superior properties can be industrially produced at a low cost and on a mass production basis.

The invention claimed is:

1. A method of producing a silicon nitride powder comprising firing an amorphous Si—N(—H)-based compound having a specific surface area of 400 to 1,200 $m^2/g$ at a temperature of 1,400 to 1,700° C. in a nitrogen-containing inert gas atmosphere or a nitrogen-containing reducing gas atmosphere while flowing the compound in a continuous firing furnace, wherein:
    assuming that a specific surface area of said amorphous Si—N(—H)-based compound is RS ($m^2/g$) and an oxygen content ratio is RO (mass %), RS/RO is 500 or more, and
    during said firing, said amorphous Si—N(—H)-based compound is heated at a temperature rising rate of 12 to 100° C/min in a temperature range from 1,000 to 1,400° C.

2. The method according to claim 1, wherein:
    the specific surface area of said silicon nitride powder is from 5 to 30 $m^2/g$, and
    assuming that the content ratio of oxygen existing in a region from a particle surface to 3 nm beneath the particle surface is FSO (mass %), the content ratio of oxygen existing in a more inward side than 3 nm beneath the particle surface is FIO (mass %), and the specific surface area is FS ($m^2/g$),
    FS/FSO is from 8 to 25, and
    FS/FIO is 22 or more.

3. The method according to claim 2, wherein when said silicon nitride powder is measured for a particle size distribution on a volume basis by a laser diffraction particle size distribution meter, the ratio D10/D90 between a 10 vol % diameter D10 and a 90 vol % diameter D90 is 0.1 or more.

4. The method according to claim 1, wherein said amorphous Si—N(—H)-based compound is represented by $Si_6N_{2x}(NH)_{12-3x}$ (provided that x=0.5 to 4 and the compound includes a compound containing a halogen as an impurity).

5. The method according to claim 1, wherein said RS/RO is 1,000 or more.

6. The method according to of claim 1, wherein said temperature rising rate is from 15 to 60° C./min.

7. The method according to claim 1, wherein the temperature range during said firing is from 1,400 to 1,600° C.

8. A silicon nitride powder having a specific surface area from 5 to 30 $m^2/g$; wherein, assuming that the content ratio of oxygen existing in a region from a particle surface to 3 nm beneath the particle surface is FSO (mass%), the content ratio of oxygen existing in a more inward side than 3 nm beneath the particle surface is FIO (mass %), and a specific surface area is FS ($m^2/g$), FS/FSO is from 8 to 25 and FS/FIO is 22 or more; and when a particle size distribution on a volume basis is measured by a laser diffraction particle size distribution meter, the ratio D10/D90 between a 10 vol % diameter D10 and a 90 vol % diameter D90 is 0.1 or more.

9. The silicon nitride powder according to claim 8, which does not contain metallic silicon.

10. The silicon nitride powder according to claim 8, wherein said specific surface area is from 7 to 25 m²/g, said FS/FSO is from 10 to 22, and FS/FIO is 25 or more.

11. A silicon nitride sintered body obtained by sintering the silicon nitride powder according to claim 8.

12. The silicon nitride sintered body according to claim 11, having a relative density of 99% more, a bending strength at room temperature of 1,000 MPa or more, and a bending strength at 1,200° C. of 600 MPa or more.

13. The silicon nitride sintered body according to claim 11, having a relative density of 99% more, a bending strength at room temperature of 600 MPa or more, and a coefficient of thermal conductivity of 100 W/mK or more.

14. A circuit substrate comprising the silicon nitride sintered body according to claim 13.

15. The method according to claim 2, wherein said amorphous Si—N(—H)-based compound is represented by $Si_6N_{2x}(NH)_{12-3x}$ (provided that x=0.5 to 4 and the compound includes a compound containing a halogen as an impurity).

16. The silicon nitride powder according to claim 9, wherein said specific surface area is from 7 to 25 m²/g, said FS/FSO is from 10 to 22, and FS/FIO is 25 or more.

17. A silicon nitride sintered body obtained by sintering the silicon nitride powder according to claim 9.

18. A silicon nitride sintered body obtained by sintering the silicon nitride powder according to claim 10.

19. The method according to claim 2, wherein said RS/RO is 1,000 or more.

20. The method according to claim 3, wherein said RS/RO is 1,000 or more.

* * * * *